United States Patent (10) Patent No.: US 7,477,596 B1
Burch et al. (45) Date of Patent: Jan. 13, 2009

(54) POLICING ENGINE PROVIDING DYNAMIC ADJUSTMENT OF PEAK AND SUSTAINED DATA CELL RATES AND EFFICIENT TRANSFER OF AAL5 CELLS

(75) Inventors: Richard A. Burch, Madison, AL (US); Neil M. Jensen, Madison, AL (US); Dennis B. McMahan, Huntsville, AL (US); Timothy David Rochell, Elkmont, AL (US)

(73) Assignee: Adtran, Inc., Huntsville, AL (US)

( * ) Notice: Subject to any disclaimer, the term of this patent is extended or adjusted under 35 U.S.C. 154(b) by 931 days.

(21) Appl. No.: 10/930,086

(22) Filed: Aug. 31, 2004

(51) Int. Cl.
*H04J 1/16* (2006.01)
(52) U.S. Cl. .................. 370/229; 370/412
(58) Field of Classification Search ............. 370/229, 370/230, 230.1, 231, 232, 233, 234, 235, 370/235.1, 252, 253, 429, 412, 394, 418, 370/416, 399, 395.1, 395.2, 395.21, 395.43; 709/226, 232
See application file for complete search history.

(56) References Cited

U.S. PATENT DOCUMENTS 5,570,360 A * 10/1996 Klausmeier et al. ........ 370/232
5,764,641 A * 6/1998 Lin .......................... 370/412
6,108,303 A * 8/2000 Fahmi et al. ............... 370/230
6,198,743 B1 * 3/2001 Giroux et al. ............ 370/235.1
6,975,594 B1 * 12/2005 Byers ....................... 370/238
6,987,733 B2 * 1/2006 Mukouyama et al. ....... 370/236
7,126,911 B2 * 10/2006 Zhao et al. ................. 370/230

* cited by examiner

*Primary Examiner*—Chi H Pham
*Assistant Examiner*—Alexander Boakye
(74) *Attorney, Agent, or Firm*—Allen, Dyer, Doppelt, Milbrath & Gilchrist, P.A.

(57) ABSTRACT

A policing engine for use in a telecommunication equipment shelf is operative to control the rate at which customer-sourced ATM packets are passed to buffers associated with different classes of service to which customers may subscribe. The policing engine examines the rate at which ATM cells are supplied to it from the line card ports, whether the cells are AAL5 cells, and how full are the buffers into which the cells are to be written. If cells are supplied to the policing engine at a rate faster than prescribed peak or sustained cell rates, or if the cell buffer begins to fill up, the policing engine controllably discards incoming cells, thereby effectively 'throttling' the cell flow rate through it.

25 Claims, 3 Drawing Sheets

POLICING ENGINE PROVIDING DYNAMIC ADJUSTMENT OF PEAK AND SUSTAINED DATA CELL RATES AND EFFICIENT TRANSFER OF AAL5 CELLS

CROSS-REFERENCE TO RELATED APPLICATION

The present application relates to subject matter disclosed in co-pending U.S. patent application Ser. No. 10/930,101 (hereinafter referred to as the '101 application), filed Aug. 31, 2004, entitled: "System Architecture for Linking Channel Banks of a Data Communication System," by R. Burch et al, assigned to the assignee of the present application, and the disclosure of which is incorporated herein.

FIELD OF THE INVENTION

The present invention relates in general to telecommunication systems and subsystems thereof, and is particularly directed to a policing engine, respective ones of which are installable in channel banks of a multi-channel bank architecture of the type described in the '101 application, and which is operative to control the rate at which information cell packets supplied from customer ports of line card circuits of its channel bank are written into buffers associated with different classes of service to which customers may subscribe. This cell rate control is such that the flow and storage of (asynchronous transfer mode (ATM) cells, including ATM Adaptation Layer 5 (AAL5) cells) in the buffers is efficient, conforms with subscription rates of the various line card ports, and avoids writing cells into the buffers at a rate faster than the rate at which the buffers are read out for uplink transport to the system's switch fabric and application thereby to the network.

BACKGROUND OF THE INVENTION

As described in the '101 application, an on-going objective of the telecommunications industry is to increase the number of customers that may be serviced by a single channel bank connection with a network, such as but not limited to a DS3 or oC3 network connection. In the past, this objective has been addressed primarily by using either bus extension or channel bank subtending. Pursuant to the bus extension approach, the physical length of the backplane bus of a master channel bank is increased by means of a bus extension (e.g., ribbon) cable, in order to allow more line cards to be daisy chain-connected to the bus. In this type of architecture, upstream directed data (from the customer to the network) passes from a customer interface with a line card onto the bus extension, and then into the switching fabric through which a connection with the network is afforded, using a policing engine (a flow control mechanism) resident within the switch fabric of the master channel bank. Downstream directed data (from the network to a customer) enters the switch fabric where it is scheduled for downstream routing, and then transported across the bus extension into a line card and passed on to the customer. Information concerning policing, scheduling and queuing engines is contained in ITU-T Recommendation I-371 Traffic Control and Congestion Control for B-ISDN.

In the second approach, multiple line card slots of the master channel bank are usurped by channel bank expansion cards, which are respectively linked to associated subtended channel banks. In such an architecture, upstream-directed data passes from the customer interface into a line card of one of the subtended channel banks. From the line card, the data passes into the subtended channel bank's switch fabric, where the data is policed and scheduled for delivery to the network, via the master channel bank's network connection. However, before it is delivered to the network, the data is passed over the primary channel bank's bus into another switch fabric, where is again policed and scheduled. It is then passed onto the network connection for delivery to the network. Downstream-directed data enters the switch fabric of the master channel bank from the network connection, and is transferred therefrom down to a network card (which typically occupies two line card slots of the master channel bank), which passes the data on to the switch fabric of a subtended channel bank, for delivery to a line card of that channel bank. Every time data enters a subtended bank's switching fabric it is policed and scheduled.

The bus extension approach has a number of limitations. For example, given the fact that the extension bus is shared among the master channel bank and one or more expansion channel banks, a problem may arise if one of the channel bank cards malfunctions and seizes control of the extension bus. This could terminate or prevent data transfers on the shared bus. Moreover, since the channel banks are connected by way of a bus extension cable, there is a practical, noise-coupling limitation as to the number of channel banks that can be daisy chained together. In addition, the bus extension cable is usually bulky and expensive.

The network card extension approach is also limited by a number of factors. One is the fact that since the channel banks are interlinked by using network connections that usurp multiple line card slots, the primary bank loses the availability of line cards that would otherwise be used to provide service to customers. Also, the use of network cards adds a greater expense for data expansion, and limits the number of customers that can be serviced by the host channel bank. In addition, as each of the subtended channel banks requires a network connection, the switch fabric must be replicated on each subtended channel bank, which implies the need to replicate policing and scheduling mechanisms, and adds to the expense.

In accordance with the invention disclosed in the '101 application, such drawbacks of conventional channel bank expansion architectures are effectively obviated by a single switch fabric-based, multi-channel bank architecture, that contains a primary channel bank, and one or more expansion channel banks, which are linked with the primary channel bank by way of upstream and downstream communication links, and distributed among which channel banks are respective policing engines and cell rate control mechanisms for controlling upstream-directed communications from customer ports to the network.

SUMMARY OF THE INVENTION

The present invention is particularly directed to the policing engine employed by the respective channel banks of the system of the '101 application. As pointed out briefly above, this policing engine is operative to control the rate at which data (such as ATM packets) supplied by various customer ports and intended for the network, is allowed to be written into buffers associated with respectively different classes of service to which customers may subscribe. For this purpose, the policing engine examines the rate at which ATM cells are supplied to it from the line card ports, the types of cells (in particular, whether the cells are AAL5 cells), and how full are the buffers into which the cells are to be written. If incoming cells are supplied to the policing engine at a rate faster than the customer's subscription rate, or if the buffer for those cells begins to fill up, the policing engine responds by controllably discarding incoming cells, thereby effectively 'throttling' the cell flow rate through it.

To implement this 'throttling' functionality, the policing engine according to the present invention uses a pair of counters associated with peak cell rate and sustained cell rate to delineate the time of arrival of a respective cell presented to it. These counters are continuously incremented by a clock signal having a frequency associated with the subscription data rate of the incoming cells. As each counter is incremented, its count value at the time of arrival of a cell is compared with a count value associated with a theoretical arrival time (TAT) at which the next cell following a previously received cell is 'expected' to arrive, based upon a prescribed relationship referenced to the subscription rate for those cells.

In general, as long as the count value at the time of arrival of a cell is greater than or equal to the theoretical arrival time count value, it is inferred that the transport rate of the incoming cell is not effectively faster than the subscription data rate, and is considered to 'conform'. On the other hand, if the count value at the arrival of a cell is less than the theoretical arrival time count value, it is inferred that the newly arriving cell is supplied at a data rate faster than the subscription rate, and is therefore 'non-conforming'. Conforming cells are written into their associated buffer, while non-conforming cells are dropped. In addition, when a cell is determined to be conforming, theoretical arrival time values associated with the peak-cell rate and the sustained cell rate are updated for processing future cells.

In order to efficiently expedite the flow of AAL5 packets, a determination is made, prior to comparing the arrival times of a cell with a peak cell rate count value and a sustained cell rate count value, as to whether the incoming cell is an AAL5 cell and, if so, whether the routine is in AAL5 'discard' mode. The policing engine is placed in AAL5 'discard' mode, if analysis of cell of the current AAL5 packet results in that cell being non-conforming. Once a respective cell of an AAL5 packet has been identified as non-conforming, all remaining cells of the packet, save the end of packet cell, are discarded.

On the other hand, if the incoming packet is an AAL5 packet and the routine is not in AAL5 discard mode, the cell is processed to determine whether or not it is conforming. If the first cell of an AAL5 packet is determined to be conforming, and the buffer is not at least half full, which implies that it has sufficient capacity to store a complete AAL5 packet, the routine becomes 'committed' to accepting every AAL5 cell for storage in the buffer. On the other hand, if the policing engine has begun to discard AAL5 cells, it will continue to do so for all remaining cells of the AAL5 packet, except for an end of packet (EOP) cell. This avoids unnecessary processing of AAL5 cells, once it has been determined that the packet is to be discarded. If the first cell of the AAL5 frame has been accepted and the routine is committed to passing the entire AAL5 packet, then, as each AAL5 cell is received, it is used to update the peak and sustained cell rate theoretical arrival times. Once the last or EOP cell in the AAL5 packet is processed, the 'commitment' of the routine to automatically pass incoming cells is terminated, pending the arrival of a new packet.

The purpose of peak cell rate processing is to accommodate 'bursty' instances of data flow, where the cell rate of a channel temporarily exceeds a sustained data rate which effectively corresponds to the subscription rate. As long as the length of time that a channel is supplying data at a cell rate in excess of its subscription rate is relatively short, the policing engine will attempt to accommodate it. However, if incoming data is supplied at the peak data rate for more than relatively short burst, cells will be determined to be non-conforming and discarded. The sustained cell rate theoretical arrival time count value is slower than the peak cell rate count, and serves to more closely match the subscription data rate. To accommodate for anomalies in the data flow path that may give rise to very small time-of-arrival differences from the theoretical arrival times, prescribed tolerance values are subtracted from each of the peak cell rate and sustained cell rate theoretical arrival time values in the course of updating the values for the theoretical arrival times.

As an alternative to comparing the cell arrival time count values with the theoretical arrival time values, the cell processing routine also determines whether the counters have counted up to values that have caused 'expired' flags to be asserted. To understand the use of 'expired' flags in accordance with the invention, it may noted that the basic purpose of comparing the actual arrival time of a cell with an associated theoretical arrival time for that cell is to determine whether the cell is arriving reasonably close to its expected arrive time. To quantify cell arrival times, (for both the peak cell rates and the sustained cell rates) a determination is made as to whether 1) the cell has arrived reasonably close to or in the vicinity of the theoretical arrival time, 2) the cell has arrived considerably later than the theoretical arrival time, or 3) the cell has arrived considerably earlier than the theoretical arrival time.

To quantify these three intervals for peak cell rate counter, the counter may be divided into three count zones. Since, however, a two bit digital code required to represent three count zones can also be used to represent four count zones, the counter range is preferably divided up into four successively contiguous count zones. Whether or not an expired flag is to be set for a particular cell is determined by examining in which count zone the actual time of arrival of that cell occurs, relative to the count zone containing its theoretical time of arrival. Pursuant to the invention, an 'expired' flag is set, if the count zone in which the cell actually arrives is more than one count zone ahead of the count zone containing the theoretical arrival time.

The relationships for defining the theoretical arrival times are such that as a theoretical arrival time value is successively updated from an initial relatively small value, its value tends to increase substantially over several or more iterations. This has the effect of causing the police engine to discard cells supplied at elevated data rates, and tends to force the incoming cell traffic to conform with the sustained cell rate. The relationships also take into account how full the buffer has become. When the cell occupancy of the buffer is relatively small, the theoretical arrival time value is also smaller; however as the available storage depth of the buffer decreases, the theoretical arrival time value increases exponentially. This has the effect of significantly increasing the value of the theoretical arrival time value, so that a greater number of cells arriving at the policing engine will be discarded, rather than being buffered for transmission to the network. This 'throttling' of the incoming cells allows the cell occupancy of the buffer to be reduced as the cells are read out and forwarded to the switch fabric. Then, as the cell occupancy of the buffer decreases, the theoretical arrival time values decrease also, allowing more incoming cells to be accepted for storage in the buffer.

DETAILED DESCRIPTION

Before detailing the policing engine in accordance with the present invention, it should be observed that the invention resides primarily in a prescribed arrangement of conventional digital communication circuits and components and attendant supervisory communications microprocessor circuitry, as well as application software therefor, that controls the operations of such circuits and components. In a practical implementation that facilitates its incorporation into commercially available digital telecommunication transceiver equipment, the inventive arrangement is preferably implemented using field programmable gate array (FPGA)-configured, application specific integrated circuit (ASIC) chip sets. In a hardware implementation, digital ASICs are preferred.

Consequently, the configuration of such subsystems and components and the manner in which they may be interfaced with telecommunication channels have, for the most part, been shown in the drawings by a readily understandable block diagram, and an associated flow chart, which show only those specific details that are pertinent to the present invention, so as not to obscure the disclosure with details which will be readily apparent to those skilled in the art having the benefit of the description herein. Thus, the block diagram and associated flow chart are primarily intended to show the major components of the invention in convenient functional groupings, whereby the present invention may be more readily understood.

Figure 1:
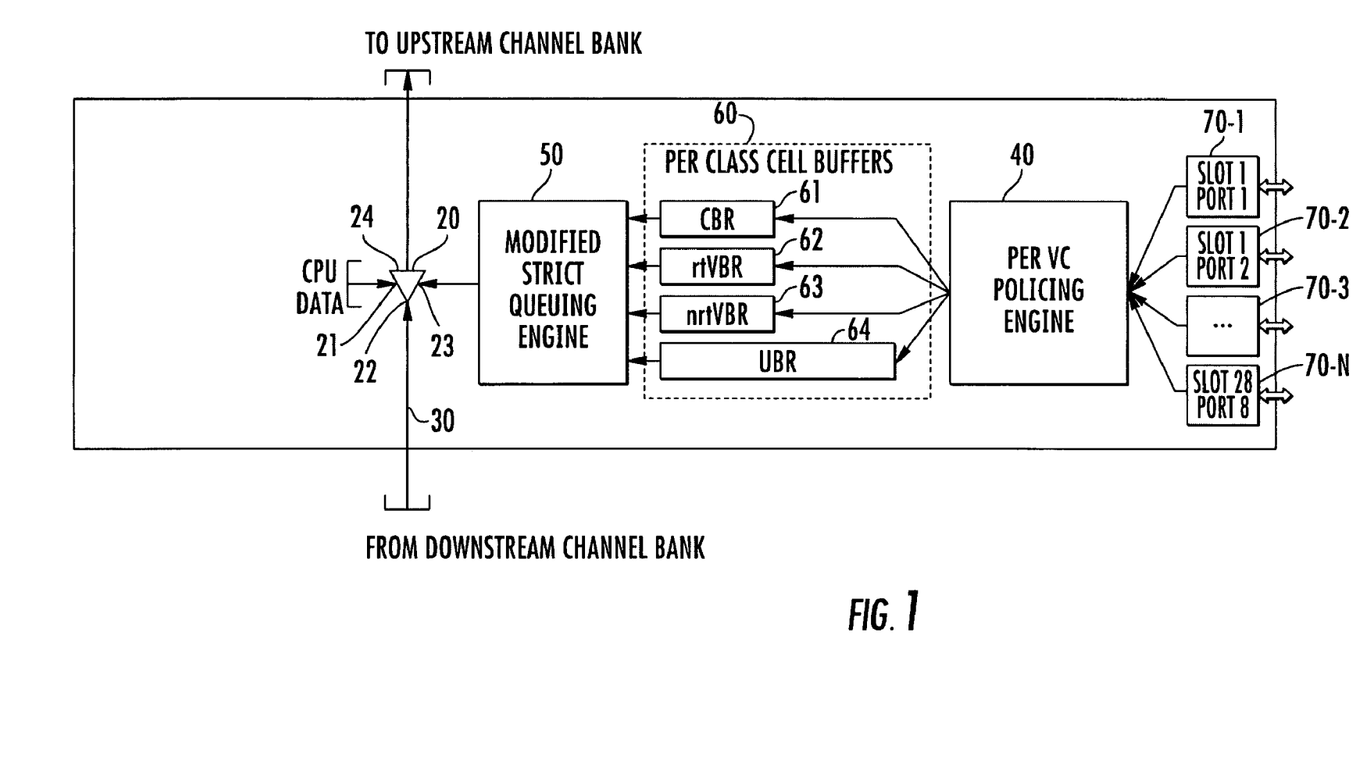
FIG. 1 is a reduced complexity block diagram of the port-to-network communication components of a respective channel bank employed in the multi-channel bank architecture disclosed in the '101 application.

Attention is now directed to FIG. 1, which is a reduced complexity block diagram of the port-to-network communication components of a respective channel bank employed in the multi-channel bank architecture disclosed in the '101 application. As shown therein, a respective channel bank/equipment shelf 10 contains an upstream communication multiplexer 20, the output 24 of which is coupled with an upstream Giga-bit Media Independent Interface (GMII) segment 30. Multiplexer 20 has up to three inputs. A first of these inputs 21 is adapted to be coupled to receive CPU data, such as maintenance, statistics, or any other type of general data that needs to be shared between equipment shelves from a channel bank processor (not shown). A second input 22 of the multiplexer is adapted to be coupled to the GMII segment 14 from an immediately adjacent downstream channel bank, while a third multiplexer input 23 is coupled to receive customer data from the multiplexer's channel bank, and it is this customer-to-network data flow path in which the policing engine of the present invention, shown at 40, resides.

More particularly, the third multiplexer input 23 is coupled to the output of a modified strict queuing engine 50, inputs to which are supplied from a set of cell buffers 60, having different priorities or classes of service. As a non-limiting example, the size of each cell buffer may be on the order of 128 Kbytes. The cell buffer set 60 includes a constant bit rate (CBR) buffer 61 (which has the highest priority), a real time variable bit rate (rtVBR) buffer 62 (which has a priority less than buffer 61, but greater than those of buffers 63 and 64), a non-real time variable bit rate (nrtVBR) buffer 63 (having the second lowest priority), and an undefined bit rate (UBR) buffer 64 (the lowest priority).

The cell buffers of a respective shelf are loaded with ATM cells, under the control of that shelf's policing engine 40, inputs to which are supplied by line card ports 70-1, . . . , 70-N of the equipment shelf to which customer data is coupled. The policing engine is configured to comply with a specification published by the ITU and the ATM forums, and determines the extent to which ATM cells supplied from a customer port 'conform' with a prescribed set of criteria for being passed to the network. In general, cells are considered to conform, if their peak and sustained cell rates (and associated variances) are equal to or less than values previously agreed to by the user and the service provider; namely, they are associated with a prescribed class-of-service.

Each ATM cell has a virtual path identifier and a virtual circuit identifier. The policing engine uses these 'tags' to match up with parameters provisioned by the customer and conform the ATM cells with each of a peak cell rate, corresponding to the maximum number of ATM cells that can be sent through the system within a limited time interval, and a sustained cell rate, effectively corresponding to the subscription rate. In addition, policing engine 40 executes a prescribed flow control algorithm that serves to optimize the transport of data in the upstream direction, so as to prevent the buffers 60 from being overfilled.

The modified strict queuing engine 50 extracts ATM cells from the buffers 60 in accordance with a prescribed percentage of the time priority assigned to each cell buffer, so as to prevent a data flow bottleneck at the outputs of the cell buffers, in the unlikely, albeit possible, event that all of the line cards of the channel bank attempt to upload ATM cells at the same time. As a non-limiting example, CBR buffer 61 may be assigned 40% of the available bandwidth, rtVBR buffer 62 may be assigned 30% of the available bandwidth, nrtVBR buffer 63 may be assigned 20% of the available bandwidth, and UBR buffer 64 may be assigned 10% of the available bandwidth.

If any of these buffers has no data stored in it, then the available bandwidth of the remaining buffers is increased in accordance with their percentage relationships among themselves. Thus, for example, if UBR buffer 64 is empty, there is an extra 10% of bandwidth to be divided up among the other three buffers. Based upon their bandwidth allocations relative to each other, buffer 61 would gain an additional 4.4%, buffer 62 would gain an additional 3.3%, and buffer 63 would gain an additional 2.2%. This priority of assignment formula prevents one class of service from 'hogging' the bandwidth, yet weights bandwidth allocation in favor of the highest priority of use, so as to provide a reasonable balance among the various classes of cells being supplied to the policing engine.

Figure 2:
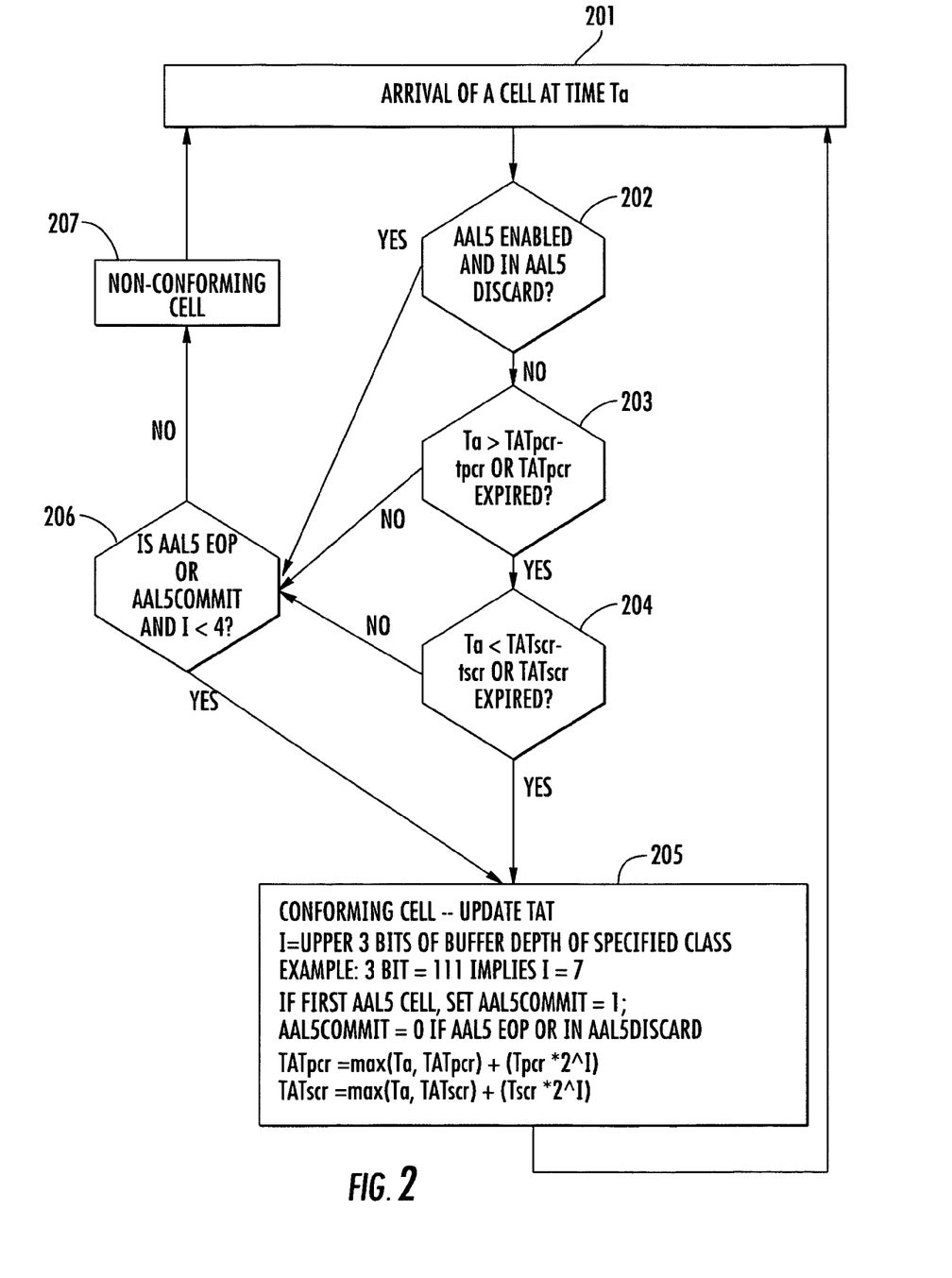
FIG. 2 is a flow chart showing the respective steps of the policing engine in accordance with the present invention.

Attention is now directed to the flow chart of FIG. 2, wherein respective steps of the policing engine in accordance with the present invention are shown. The initial task of the policing engine is to note the time of arrival (Ta) at which a respective cell is presented to it. As noted previously, pursuant to the invention, cell arrival time is monitored by keeping track of the contents of a pair of counters, which are continuously incremented by a clock signal having a frequency associated with the subscription data rate of the incoming cells. One of these counters, TATpcr, is associated with peak cell rate (pcr), and the other counter, TATscr, is associated with the sustained cell rate (scr). As each counter is incremented, its count value Ta at the time of arrival of a cell is compared with a count value associated with a Theoretical Arrival Time (TAT) at which the next cell following a previously received cell is 'expected' to arrive, based upon a prescribed relationship referenced to the subscription rate for those cells.

As pointed out above, in general, as long as the count value Ta is greater than or equal to the TAT count value, indicating that the cell is supplied to the policing engine at a time later than the theoretical arrival time, it is inferred that the cell has a transport rate that does not effectively violate the subscription data rate, so that the cell is considered 'conforming'. On the other hand, if the count value Ta is less than the TAT count value, it is inferred that the newly arriving cell is supplied at a data rate that is faster than the subscription rate, and is therefore considered to be 'non-conforming'. Conforming cells are written into their associated buffer, while non-conforming cells are dropped. Moreover, as detailed below, once a cell has been determined to be conforming, TAT values associated with the peak cell rate and the sustained cell rate are updated in accordance with algorithms that use both the current TAT count value and the Ta count value.

More particularly, at a first step 201, at the arrival of a cell, the count values of a peak cell rate counter TATpcr and a sustained cell rate counter TATscr are stored as an arrival time count value Ta. The routine then transitions to AAL5 query step 202. In this step, a determination is made as to whether the incoming cell is an AAL5 cell and, if so, whether the policing engine routine is in AAL5 'discard' mode. The policing engine will have been placed in AAL5 discard mode, if analysis of a previously received cell of a currently received AAL5 packet has resulted in that previous cell being non-conforming. Once an AAL5 cell has been determined to be non-conforming, all remaining cells of the packet, save the last or end of packet (EOP) cell, are discarded. For purposes of the present description, AAL5 cell processing in steps 202 and 206, to be detailed below, will be temporarily ignored, so that the answer to query step 202 is presumed to be NO, so that the routine transitions to peak cell rate query step 203.

The peak cell rate query step 203 is used to accommodate 'bursty' instances of data flow, wherein the data rate of a channel temporarily exceeds a sustained data rate which effectively corresponds to its subscription rate, it being recalled that the purpose of the policing engine is to optimize data flow over all channels to the network. As long as the length of time that a channel is supplying data at a cell rate in excess of its subscription rate is relatively short, the policing engine will attempt to accommodate it. However, if incoming data is supplied at a relatively high data rate for more than relatively short burst, it will be determined to be non-conforming and discarded.

To this end, in query step 203, the time-of-arrival count value Ta derived in step 201 is compared with a peak cell rate (pcr) theoretical arrival time count value TATpcr. TATpcr is a count value to which the TATpcr counter is permitted to have been incremented at the time of arrival of the current cell of interest. In general, if the count value Ta of the arriving cell is at least as large as the TATpcr count value, it is inferred that the data rate of the arriving cell is slower than TAT peak cell rate, and the cell is considered to be potentially conforming.

For purposes of providing an illustrative example, let it be assumed that the peak rate of arrival of incoming cells corresponds to TAT count values having successive differences of 50, such as the count values 50, 100, 150, 200 and so on. In reality, however, it can reasonably be expected that the cell arrival rate will be offset slightly from the peak data rate, so that cells may arrive at count values such as 49, 101, 153 and the like, rather than at the precise TATpcr count values of 50, 100, 150, etc. The first cell in the sequence of this example has an arrival time count value of 49, which is less than the peak cell rate TAT count value of 50. On this basis alone, the data rate of the first arriving cell exceeds the peak cell rate, apparently making this cell non-conforming. However, it can also be seen that the overall arrival rate of this and subsequent cells is relatively close to that of the peak cell rate theoretical arrival times, so that cell arrival times 'generally' appear to conform with peak cell rate criteria.

To accommodate for anomalies in the data flow path that may give rise to time-of-arrival differences from the theoretical arrival times, a prescribed tolerance value tpcr is subtracted from each of the peak cell rate count values in the course of making the Ta vs. TATpcr comparison. For this purpose, a relatively small peak cell rate tolerance value tpcr is subtracted from the TATpcr count value. In the above example of the successive TAT values, 50, 100, 150, 200 and so, a variance or offset value such as 5 may be used, to realize 'modified' TAT values 45, 95, 145, 195, and so on. This means that the arrival time count value Ta=49 for the first cell is greater than TATpcr (50)−tpcr (5)=45, so that this cell is potentially conforming (pending further processing in subsequent query step 204 to determine whether the cell rate satisfies sustained cell rate criteria). Therefore, as long as the count value Ta is greater than or equal to the TATpcr count value (less a prescribed peak cell rate tolerance tpcr), it may be inferred that the incoming cell is effectively being supplied at a rate that is no greater than a prescribed peak cell rate, so that the cell is considered to be potentially conforming, and the output of query step 203 is YES.

In addition to determining whether the cell arrival time count satisfies a peak cell rate theoretical arrival time count, step 203 determines whether the TATpcr counter has expired, namely whether an 'expired' flag has been set for the TATpcr counter. As note above, the basic purpose of comparing the actual arrival time of a cell with an associated theoretical arrival time for that cell is to determine whether the cell is arriving reasonably close to its expected arrive time. To quantify cell arrival times relative to a theoretical arrival time, a determination may be made as to whether 1) the cell has arrived reasonably close to or in the vicinity of the theoretical arrival time, 2) the cell has arrived considerably later than the theoretical arrival time, or 3) the cell has arrived considerably earlier than the theoretical arrival time.

To quantify these three intervals, the TATpcr counter may be divided into three count zones. However, as a two bit digital code for representing three count zones can also be used to represent four count zones, the range of the TATpcr counter is preferably divided up into four successively contiguous equal count zones. These zones are shown in the circular timing count diagram of FIG. 3 as comprising: a first count zone T21, which extends between 0 and a count value R; a second count zone T22, which extends between count value R and a count value 2R; a third count zone T23, which extends between count value 2R and count value 3R; and a fourth count zone T24, which extends between count value 3R and an end count value 4R (which wraps around to 0).

Figure 3:
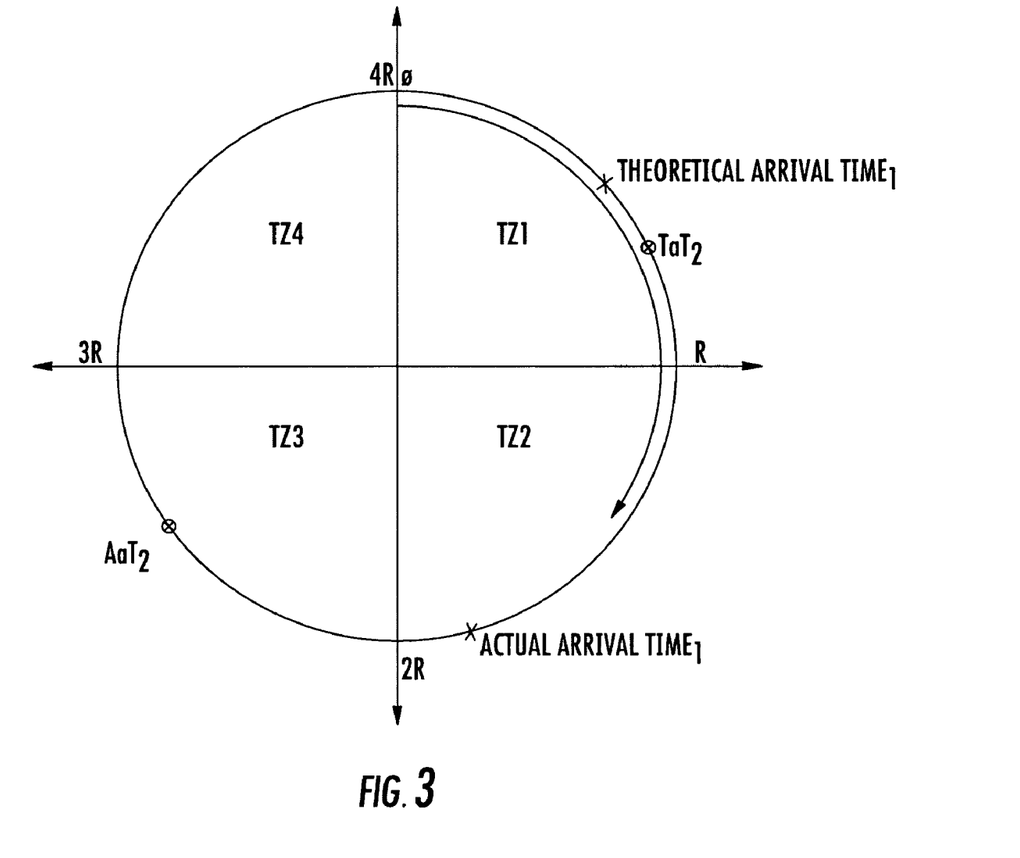
FIG. 3 diagrammatically illustrates the subdivision of the count range of a respective TAT counter into four successively contiguous time zones.

As pointed out earlier whether or not an expired flag is to be set for a particular cell is determined by examining in which count zone the actual time of arrival of that cell occurs, relative to the count zone containing its theoretical time of arrival. Pursuant to the invention, an 'expired' flag is set, if the count zone in which the cell actually arrives is more than one count zone ahead of the count zone containing the theoretical arrival time.

As a non-limiting example, FIG. 3 shows a $TAT_1$ occurring in time zone T21, with the Actual Arrival Time$_1$ of the cell occurring in time zone T22. Since the time zone T22 in which the Actual Arrival Time$_1$ occurs is not separated from the time zone T1 in which $TAT_1$ occurs, no 'expired' flag is set. On the other hand, FIG. 3 also shows a $TAT_2$ occurring in time zone T21, whereas the Actual Arrival Time$_2$ of the cell does not occur until time zone T23. Since the time zone T23, in which the Actual Arrival Time$_2$ occurs, is separated from the time zone T1 in which TAT$_2$ occurs by the time zone T22 therebetween, an 'expired' flag is set (immediately upon the counter reaching the value 2R).

It will also be appreciated that this expiration flag assertion routine also serves to prevent a roll-over or wrap-around of the counter to a count value that is less than the TATpcr count from erroneously indicating that the data rate is in excess of the allowed peak cell rate.

For the above example, let it be assumed that the current cell, which should have arrived at a TATpcr counter value on the order of 49, is extremely delayed and does not arrive until just after the counter has counted up to its maximum value and rolled over, so that the Ta count value is a relatively small value (e.g., 40), rather than the value of 49 it would have had if the cell had arrived as described above. In this case, the value of Ta (40) is less than TATpcr (50)−tpcr (5)=45, so that the cell appears to be non-conforming. In accordance with the alternative test of step 203, however, this incorrect result is avoided by having the expired flag take precedence, superseding the incorrect indication that the value of Ta is less than TATpcr−tpcr. For the parameters of the present example, the answer to query step 203 is YES, so that the routine transitions to sustained cell rate query step 204. If the answer to query step 203 had been NO, the routine would transition to AAL5 processing step 206, to be described.

Sustained cell rate query step 204 is the same as step 203, except that the incoming cell's time-of-arrival count value Ta is compared with a sustained cell rate (scr) theoretical arrival time count value TATscr. The sustained cell rate theoretical arrival time count value is higher than the peak cell rate count, and serves to more closely match the subscription data rate, to which the TATscr counter should be incremented at the time of arrival of the current cell of interest once a sustained cell rate has been realized. For the parameters of the above example, let it be assumed that the incoming cells, if they were arriving at exactly at the subscription data rate, would arrive periodically at count difference values of 100, such as at the count values 100, 200, 300 and so on. It may be noted that the larger count values are due to the fact that the data rate of interest is the sustained data rate, which more closely tracks the subscription rate and is therefore slower than the peak cell rate.

As in the case of the peak cell rate, it can be expected that the cell arrival rate may slightly differ from the sustained cell rate, so that cells arrive at count values that do not exactly match the sustained cell rate. Again, to accommodate for anomalies in the data flow path that give rise to such time-of-arrival offsets, a prescribed sustained cell rate tolerance or variance tscr is subtracted from the sustained rate count value with which the arrival time count Ta is compared. As was the case with the peak cell rate comparison of step 203, as long as the count value Ta is greater than or equal to the TATscr count value less the sustained cell rate tolerance tscr, it is inferred that the incoming cell is effectively being supplied at a rate than is no greater than the sustained cell rate. For the present example, the answer to query step 204 is assumed to YES—the cell is considered to be conforming, so that the routine transitions to conforming cell update step 205.

In addition to comparing the cell arrival time count with the sustained cell rate theoretical arrival time count, step 204 also determines whether operation of the TATscr counter has caused an 'expired' flag to be asserted, as described above with reference to FIG. 3. As was the case with peak cell rate comparison step 203, this serves to prevent the event of a counter roll-over from erroneously indicating that the sustained data rate is in excess of its subscription rate. In step 204, this incorrect result is avoided by having the counter expiration supersede the incorrect indication that the arrival time count Ta is less than TATscr−tscr. Therefore, if either criterion in step 204 is satisfied, the routine transitions to conforming cell update step 205.

In step 205, the routine updates the values of TATpcr and TATscr. In addition, if AAL5 processing is involved, it sets prescribed flags, described below. For the present, with AAL5 processing is temporarily ignored only the updating of the TAT values will be described. Each TAT value (TATpcr and TAT scr) is updated by selecting the larger or maximum of the current Ta count value and the TAT value, and summing that larger/maximum value with a prescribed constant, whose value depends upon the available depth of the buffer into which the cell is to be written. Namely, $$TATpcr = \max(Ta, TATpcr) + (Tpcr * 2^I), \text{ and}$$

$$TATscr = \max(Ta, TATscr) + (Tscr * 2^I),$$

where Tpcr and Tscr are constants associated with the subscription rate, and I is the decimal equivalent of a multibit binary number that represents the available depth of the buffer. Using a three bit number for I, as a non-limiting example, if the buffer is less than one-eighth full, I=000 or 0, and if the buffer is at least seven-eighths full, I=111 or 7.

From the relationships for TATpcr and TATscr set forth above, it can be seen that, when a TAT value is updated, its value tends to increase toward the subscription rate. Over the course of several or more iterations from an initial, relatively small value to a much larger value, this has the effect of causing the police engine to discard cells that are supplied more frequently than the subscription rate, and tends to force the incoming cell traffic to conform with the sustained cell rate.

The exponential term in the above equations takes into account how full the cell buffer has become. When the cell occupancy of the buffer is relatively small, the value of I, in turn, is relatively small (e.g., 0)—so that the constant times two raised to the Ith power is simply a doubling of the constant. On the other hand, as the available storage depth of the cell buffer decreases, the value of I increases, causing the constant to be multiplied by an exponentially larger number. This has the effect of significantly increasing the value of TAT, so that more and more cells arriving at the policing engine will be discarded, rather than being forwarded to the buffer. This 'throttling' of the incoming cells allows the cell occupancy of the buffer to be reduced as the cells are read out of the buffer. Then, as the cell occupancy of the buffer is reduced, the value of I decreases, thereby reducing the value of TAT, allowing more cells to be passed to the buffer.

As pointed out above, in addition to updating the values of TATpcr and TATscr for evaluating the next incoming cell, step 205 also raises prescribed flags associated with an AAL5 packet, if the conforming cell is that of an AAL5 frame. In particular, if the conforming cell is the first cell of an AAL5 frame, step 205 sets an AAL5 commit flag to a '1'. The purpose of this operation is to cause the policing engine, once it has begun accepting cells of an AAL5 packet for storage in the buffer, to be 'committed' to passing the remaining AAL5 cells of the packet into the buffer (regardless of whether or not the remaining AAL5 cells are conforming), as long as the cell occupancy of the buffer is no more than a prescribed value (e.g., half) associated with sufficient storage capacity to accommodate the entirety of the AAL5 packet. On the other hand, if the policing engine has begun discarding AAL5 cells, or if the AAL5 cell of interest is an end of packet (EOP) cell, step 205 sets the AAL5 commit flag to a '0'. The purpose of this operation is to avoid unnecessary processing of AAL5 cells, once it has been determined that the packet is to be discarded. When it has completed the operations of step 205, the routine transitions back to step 201. The manner of processing AAL5 cells will now be described.

When a cell is received and its time of arrival Ta is stored in step 201, the routine transitions to AAL5 query step 202, as described above. In step 202, a determination is made as to whether the incoming cell is an AAL5 cell (AAL5 enabled) and, if so, whether the routine is in AAL5 'discard' mode. Once it has discarded an AAL5 cell and thereby been placed in AAL5 discard mode, the policing engine will proceed to immediately discard all subsequent AAL5 cells (save the end of packet AAL5 cell) as they are received, so as avoid using its bandwidth for unnecessary processing of subsequent cells of the AAL5 frame, which becomes invalid whenever a cell thereof is discarded. This decision is associated with a YES answer to query step 202, causing the routine to branch to step 206. If, on the other hand, the incoming packet is an AAL5 packet and none of its cells has yet been discarded, the answer to query step 202 is NO, so that the routine transitions to step 203, and performs TAT processing of the AAL5 cell in the manner described above. If the answer to either of steps 203 and 204 is NO—indicating that the AAL5 cell is non-conforming—the routine branches to query step 206.

In query step 206, a determination is made as to whether the AAL5 cell of interest is the last cell in the AAL5 packet, or whether the AAL5 commit flag has been set to a '1', and the available capacity of the buffer is sufficient to accommodate a complete AAL5 packet. If either of these conditions is true (the answer to query step 206 is YES), the cell is considered to be conforming, and the routine branches to step 205.

The purpose of the first determination in query step 206 (whether the AAL5 cell is the last cell in the AAL5 packet) is to let the policing engine know where the AAL5 packet ends, so that it may update the TAT values in preparation for receiving a new packet. The purpose of the second determination of step 206, namely, whether the AAL5 commit flag has been set to a '1', and the whether the available capacity of the buffer is sufficient to store a complete AAL5 packet, is to commit the policing engine, once it has begun passing AAL5 cells to the buffer (which implies that the first AAL5 cell is a conforming cell), to writing all of the remaining AAL5 cells of the packet into the buffer, as long as the available storage capacity of the buffer is sufficient to accommodate the entirety of an AAL5 packet.

Assuming that the buffer has sufficient capacity to store two maximum length AAL5 frames, and using the parameters of the above example, where the available storage capacity of the buffer is represented by a three bit number I, then as long as I is less than 100 (4), it is inferred that the buffer can accommodate another complete AAL5 frame. If the answer to either of the inquiries of step 206 is NO, the routine transitions to step 207, wherein the cell is declared non-conforming and is discarded or dropped. Once a cell is discarded in step 207, the routine returns to step 201, to await the arrival of a new cell.

As will be appreciated from the foregoing description, the policing engine according to the present invention is operative to control the rate at which information cell packets supplied from customer ports of line card circuits of a respective channel bank are written into buffers associated with different classes of service to which customers may subscribe. The cell rate control provided in accordance with the invention is such that the flow and storage of ATM cells, including AAL5 cells in the buffers is efficient, conforms with subscription rates of the various line card ports, and avoids writing cells into the buffers at a rate faster than the rate at which the buffers are read out for uplink transport to the network.

While we have shown and described a preferred embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. An information cell throughput policing engine for a communication system having a plurality of channels by way of which cells are supplied to said policing engine, and a cell buffer into which cells are controllably written by said policing engine in the course of the transport of said cells from said channels to a cell transport link, said policing engine being operative to perform the steps of:

(a) monitoring the cell rate at which cells of a respective channel are supplied to said policing engine relative to a prescribed cell rate for said respective channel; and (b) in response to the cell rate monitored in step (a), adjusting, as necessary, the cell rate at which said cells are written into said buffer, so that a selected type of cell rate of said respective channel satisfies a prescribed relationship with said prescribed cell rate;

wherein said cells comprise asynchronous mode transfer (ATM) adaptation layer 5 (AAL5) cells, and said step (b) comprises, in response to the rate of a first cell of an AAL5 packet of said respective channel satisfying said prescribed relationship with respect to said prescribed cell rate, writing said first cell of said AAL5 packet into said buffer and, in response to the ability of said buffer to accommodate a complete AAL5 packet, writing remaining cells of said AAL5 packet into said buffer, irrespective of whether cell transport rates of said remaining cells satisfy said prescribed relationship with respect to said prescribed cell rate.

2. The policing engine according to claim 1, wherein said selected type of cell rate corresponds to a peak cell rate at which said cells are supplied to said policing engine.

3. The policing engine according to claim 2, wherein step (a) comprises comparing times of arrival of said cells of said respective channel at said policing engine with peak cell rate theoretical arrival times associated with said prescribed cell rate for said respective channel, and step (b) comprises, in response to said times of arrival of said cells of said respective channel at said policing engine satisfying a prescribed relationship with respect to said peak cell rate theoretical arrival times, controllably writing said cells into said buffer.

4. The policing engine according to claim 1, wherein said selected type of cell rate corresponds to a sustained cell rate at which said cells are supplied to said policing engine.

5. The policing engine according to claim 1, wherein said prescribed cell rate corresponds to a prescribed cell usage rate of said respective channel to which a user of said respective channel has subscribed.

6. The policing engine according to claim 1, wherein step (b) comprises comparing times of arrival of said cells of said respective channel at said policing engine with sustained cell rate theoretical arrival times associated with said prescribed cell rate for said respective channel, and in response to said times of arrival of said cells of said respective channel at said policing engine satisfying a prescribed relationship with respect to said sustained cell rate theoretical arrival times, writing said cells into said buffer.

7. The policing engine according to claim 1, wherein step (b) comprises adjusting peak cell rate theoretical arrival times and sustained cell rate theoretical arrival times, as necessary, to cause the rate at which said cells are written into said buffer to satisfy said prescribed relationship with respect to said prescribed cell rate.

8. The policing engine according to claim 1, wherein step (b) comprises adjusting, as necessary, the rate at which said cells are written into said buffer, in accordance with the ability of said buffer to accommodate said cells.

9. An information cell throughput policing engine for a communication system having a plurality of channels by way of which information cell packets are supplied to said policing engine, and a cell buffer into which cells of said packets are allowed by said policing engine to be controllably written, in the course of the transport of said packets from said channels to a cell transport link, said policing engine being operative to perform the steps of:

(a) monitoring the rate at which prescribed types of information cells of a respective channel are supplied to said policing engine relative to a prescribed cell rate for said respective channel; and (b) in response to the transport rate of a first cell of a packet of said respective channel satisfying a prescribed relationship with respect to said prescribed cell rate, writing said first cell into said buffer and, in response to the ability of said buffer to accommodate a complete packet, writing remaining cells of said packet into said buffer, whether or not transport rates of said remaining cells satisfy said prescribed relationship with respect to said prescribed cell rate.

10. The policing engine according to claim 9, wherein step (b) comprises, in response to the transport rate of a first cell of a packet of said respective channel satisfying said prescribed relationship with respect to said prescribed cell rate, writing said first cell into said buffer, and in response to the ability of said buffer to store a complete packet, writing said remaining cells of said packet into said buffer, without determining whether transport rates of said remaining cells satisfy said prescribed relationship with respect to said prescribed cell rate.

11. The policing engine according to claim 9, wherein said information cells comprise asynchronous mode transfer (ATM) cells.

12. The policing engine according to claim 11, wherein said information cells comprise ATM adaptation layer 5 (AAL5) cells.

13. The policing engine according to claim 9, wherein step (b) comprises, in response to the transport rate of a first cell of a packet of said respective channel failing to satisfy said relationship with respect to said prescribed cell rate, discarding said first cell and declaring said packet invalid.

14. An information cell throughput policing engine for a communication system having a plurality of channels by way of which information cell packets are supplied to said policing engine, and a cell buffer into which cells of said packets are allowed by said policing engine to be controllably written, in the course of the transport of said packets from said channels to a cell transport link, said policing engine being operative to perform the steps of:

(a) monitoring a preselected parameter of information cells of a respective channel supplied to said policing engine; and (b) in response to said preselected parameter of a first cell of a packet of said respective channel satisfying a prescribed criterion, writing said first cell into said buffer and, in response to the ability of said buffer to accommodate a complete packet, writing remaining cells of said packet into said buffer, irrespective of whether said preselected parameter of said remaining cells satisfies said prescribed criterion.

15. The policing engine according to claim 14, wherein step (b) comprises, in response to the transport rate of a first cell of a packet of said respective channel satisfying a prescribed relationship with respect to a prescribed cell rate, writing said first cell into said buffer, and in response to the ability of said buffer to accommodate a complete packet, writing said remaining cells of said packet into said buffer, without determining whether transport rates of said remaining cells satisfy said prescribed relationship with respect to said prescribed cell rate.

16. The policing engine according to claim 15, wherein said cells comprise asynchronous mode transfer (ATM) cells.

17. The policing engine according to claim 16, wherein said cells comprise ATM adaptation layer 5 (AAL5) cells.

18. An information cell throughput policing engine for a communication system having a plurality of channels by way of which cells are supplied to said policing engine, and a cell buffer into which cells are controllably written by said policing engine in the course of the transport of said cells from said channels to a cell transport link, said policing engine being operative to perform the steps of:

(a) monitoring the time of arrival at which a cell of a respective channel arrives at said policing engine relative to a theoretical arrival time for said respective channel; and (b) in response to said time of arrival satisfying a prescribed relationship with respect said theoretical arrival time for said respective channel, writing said cell into said buffer and updating said theoretical arrival time, wherein said prescribed relationship corresponds to said time of arrival differing from said theoretical time of arrival minus a prescribed variance.

19. The policing engine according to claim 18, wherein step (b) further comprises in response to said time of arrival failing to satisfy said prescribed relationship with respect said theoretical arrival time for said respective channel, discarding said cell and not updating said theoretical arrival time.

20. The policing engine according to claim 18, wherein step (a) comprises comparing a time of arrival count of a sequentially incremented counter, corresponding to the time at which a cell of a respective channel arrives at said policing engine, with a theoretical arrival time count of said counter corresponding to said theoretical arrival time for said respective channel; and wherein step (b) comprises in response to said time of arrival count satisfying a prescribed relationship with respect said theoretical arrival time count for said respective channel, writing said cell into said buffer and updating said theoretical arrival time count.

21. The policing engine according to claim 18, wherein step (a) comprises comparing a time of arrival count of a sequentially incremented counter, corresponding to the time at which a cell of a, respective channel arrives at said policing engine, with a theoretical arrival time count of said counter corresponding to said theoretical arrival time for said respective channel; and wherein step (b) comprises in response to said time of arrival count exceeding said theoretical arrival time count for said respective channel by a prescribed count difference, declaring said time of arrival count expired, writing said cell into said buffer and updating said theoretical arrival time count.

22. A method for monitoring the times of occurrence of events with respect to theoretical times of occurrence of said events comprising the steps of:

(a) comparing a first count value of a sequentially incremented counter, corresponding to the time at which an event actually occurs, with a second count value of said counter corresponding to a theoretical time of occurrence of said event;

(b) in response to said first count value exceeding said second count value by a prescribed count difference, declaring said first count value expired.

23. The method according to claim 22, wherein step (b) further comprises updating said second count value in accordance with said first count value.

24. The method according to claim 22, wherein said counter has a count capacity that is subdivided into count zones, each of which comprises a plurality of count increments through which said counter is incremented by a clock signal applied thereto, and wherein step (b) comprises, in response to said first count value being separated from said second count value by a complete count zone therebetween, declaring said first count value expired.

25. The method according to claim 24, wherein the time of occurrence of an event corresponds to the time of arrival of an information cell at a policing engine for storage into a buffer of a communication system, and wherein said theoretical time of occurrence of said event corresponds to the theoretical time of arrival of an information cell at said policing engine, and wherein step (b) comprises, in response to said first count value being separated from said second count value by a complete count zone therebetween, declaring said first count value expired and updating said theoretical time of arrival of an information cell in accordance with the time of arrival of said information cell.

* * * * *